(No Model.)

G. N. FOSTER.
CAKE OR BAKING PAN.

No. 433,236. Patented July 29, 1890.

WITNESSES:
L. Douville,
P. F. Eagle.

INVENTOR
George N. Foster,
BY
Joshua Wiedersheim
ATTORNEY.

THE NORRIS PETERS CO., PHOTO-LITHO., WASHINGTON, D. C.

UNITED STATES PATENT OFFICE.

GEORGE N. FOSTER, OF PHILADELPHIA, PENNSYLVANIA, ASSIGNOR OF ONE-HALF TO CHARLES H. SICKLES, OF EAST HARTFORD, CONNECTICUT.

CAKE OR BAKING PAN.

SPECIFICATION forming part of Letters Patent No. 433,236, dated July 29, 1890.

Application filed March 29, 1890. Serial No. 345,804. (No model.)

*To all whom it may concern:*

Be it known that I, GEORGE N. FOSTER, a citizen of the United States, residing in the city and county of Philadelphia, State of Pennsylvania, have invented a new and useful Improvement in Cake or Baking Pans, which improvement is fully set forth in the following specification and accompanying drawings.

My invention relates to improvements in cake or baking pans, and has for its object the construction of a pan which secures the proper baking of the cake, also permitting a subsequent cooling of the same, the provision of a tight joint between the parts, and finally the easy release of the cake from the pan.

For these purposes it consists, first, in providing the pan with a central flue in communication with a chamber at the base of the pan; second, of a pan with a central flue extending above the top of the body of the pan; third, of a pan composed of a separate base portion with a peripheral groove and a body portion having a bead adapted to be sprung into the said groove, and, fourth, of the combination of parts herein described.

Figure 1:
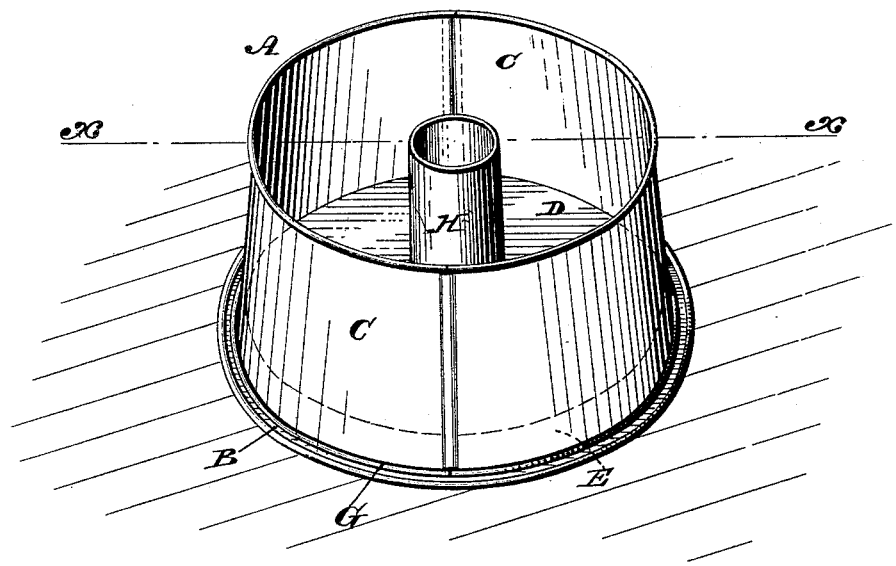
Figure 2:
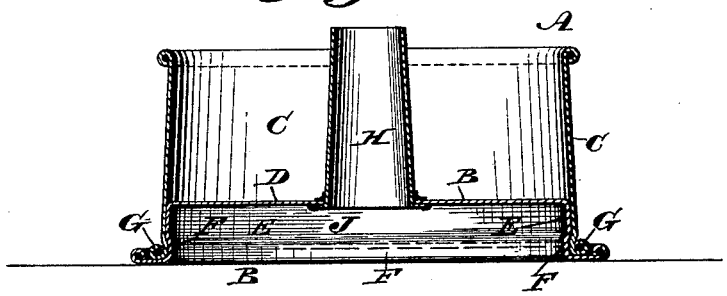
Figure 3:
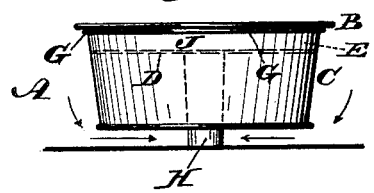

Figure 1 represents a perspective view of a cake-pan embodying my invention. Fig. 2 represents a view of a central vertical section thereof. Fig. 3 represents a side view, on a smaller scale, of the pan as inverted for cooling the cake.

Similar letters of reference indicate corresponding parts in the several figures.

Referring to the drawings, A designates a cake or baking pan, consisting of a base portion B and a side or body portion C. The base B has a bottom piece D, with a downwardly-extending rim E, which has a peripheral groove F at its lower end. The side or body portion C, which is open at both ends, is in the form of a truncated cone, and has a bead G at its lower end adapted to be sprung into the groove F, so as to closely connect the said parts B and C, and thereby prevent the leakage of the dough. To the central portion of the base B is secured a flue H, which is open at both ends and extends above the upper edge of the side portions C. The rim E of the base portion forms a heating-chamber J, which is in communication with the flue H, so that the hot air from the said chamber readily passes upward through said flue, thereby baking the central portion of the cake at the same time as the other portions thereof are baked. The said rim also serves to keep the bottom piece D from direct contact with the heating-surface, thus lessening the liability of the burning or scorching of the bottom of the cake.

The manner of using the pan is as follows: The pan as supplied with dough is placed in an oven, where, owing to the flue H communicating with the chamber J below the bottom D, the center of the cake is baked as rapidly as the sides and bottom thereof, so that all parts are baked uniformly. When the cake is baked, the pan may be inverted and rested on the flue H, thus elevating the body portion, so that what is now the bottom of the cake is exposed to the atmosphere and the air permitted to circulate under the same, whereby said bottom is cooled. The sides and what is now the top of the cake are also permitted to cool, and the entire cake prevented from dropping and becoming heavy. When the cake is sufficiently cooled, the base of the pan is withdrawn, the cake remaining held on the sides of the body, from which it may afterward be readily loosened and removed without breaking.

Having thus described my invention, what I claim as new, and desire to secure by Letters Patent, is—

1. A cake-pan having a removable side or body piece which of itself is intact, said piece being in the form of a frustum of a cone and having a bead at its lower edge, and a bottom in the form of a chamber having a horizontal groove to receive said bead of the side body, the parts named being combined substantially as described.

2. A cake-pan having a bottom piece constructed to form a chamber and provided with a central flue connected therewith, and a removable side or body portion which of itself is non-separable, said parts being combined substantially as described.

3. A cake-pan having a bottom piece with a central flue, and a side piece of itself non-separable and in the form of a frustum of a cone, the said flue extending above the top of said side piece, said parts being combined substantially as described.

4. A cake-pan having a bottom piece constructed to form a chamber and provided with depending flaring rim, a central tube open at both ends and secured to said bottom piece, and a side or body piece of itself non-separable and adapted to be secured to the rim of said bottom piece, said parts being combined substantially as described.

5. A cake-pan having a bottom piece with a depending rim with a peripheral groove therein, and a side or body piece of itself non-separable and provided with a bead adapted to be sprung into said groove, said parts being combined substantially as described.

6. A cake-pan having a bottom piece with a central flue open at both ends and secured thereto and a depending flange with a peripheral groove thereon, and a side or body piece of itself non-separable and having a bead at its lower end, the latter adapted to be sprung into said groove, the top of the flue being above the top of the sides, said parts being combined substantially as described.

GEORGE N. FOSTER.

Witnesses:
JOHN A. WIEDERSHEIM,
WM. C. WIEDERSHEIM.